United States Patent
Clawson, II et al.

(10) Patent No.: US 10,839,463 B1
(45) Date of Patent: *Nov. 17, 2020

(54) MULTIPLE PRODUCT QUOTING

(71) Applicant: Progressive Casualty Insurance Company, Mayfield Village, OH (US)

(72) Inventors: William L. Clawson, II, Shaker Heights, OH (US); Brian J. Surtz, Mentor, OH (US); Jennifer N. Burk, Jr., South Euclid, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/129,368

(22) Filed: Sep. 12, 2018

Related U.S. Application Data

(63) Continuation of application No. 15/492,450, filed on Apr. 20, 2017, now Pat. No. 10,096,069, which is a continuation of application No. 13/419,237, filed on Mar. 13, 2012, now Pat. No. 9,652,805.

(60) Provisional application No. 61/593,756, filed on Feb. 1, 2012, provisional application No. 61/452,484, filed on Mar. 14, 2011.

(51) Int. Cl.
  *G06Q 40/00* (2012.01)
  *G06Q 40/08* (2012.01)
(52) U.S. Cl.
  CPC .................... *G06Q 40/08* (2013.01)
(58) Field of Classification Search
  USPC ....................................................... 705/4, 35
  See application file for complete search history.

(56) References Cited

U.S. PATENT DOCUMENTS

| | | | |
|---|---|---|---|
| 2002/0029158 A1* | 3/2002 | Wolff ............... | G06Q 40/04 705/4 |
| 2004/0111330 A1* | 6/2004 | Stanton ............ | G06Q 30/02 705/4 |
| 2004/0143464 A1* | 7/2004 | Houle .............. | G06Q 10/10 705/4 |
| 2007/0106538 A1* | 5/2007 | Holtermann ..... | G06Q 40/08 705/4 |

OTHER PUBLICATIONS

Helms, Matt; "Potholes hard on cards and wallets: besides damage, premiums con rise"; Detroit Free Press; Detroit, Mich. (Year: 2007).*

* cited by examiner

*Primary Examiner* — Edward Chang
(74) *Attorney, Agent, or Firm* — Lempia Summerfield Katz LLC

(57) ABSTRACT

A multiproduct quoting system facilitates the purchase of multiple insurance products from two or more insurance underwriters as a bundled insurance package. A multiproduct server renders consolidated views of the multiple insurance products or combined rates of the multiple insurance products based on a plurality of insurance scores. A payment server coupled to the multiproduct server renders individualized payment plans for each of the multiple insurance products. An insurance policy module in communication with the multiproduct server renders an integrated insurance document that reflects a user's selected insurance policy parameters.

20 Claims, 14 Drawing Sheets

MULTIPLE PRODUCT QUOTING

PRIORITY CLAIM

This application is a continuation of U.S. application Ser. No. 15/492,450 filed Apr. 20, 2017, which is a continuation of U.S. application Ser. No. 13/419,237 filed Mar. 13, 2012 (now U.S. Pat. No. 9,652,805), and claims the benefit of priority from U.S. Provisional Application No. 61/452,484, filed Mar. 14, 2011 and U.S. Provisional Application No. 61/593,756, filed Feb. 1, 2012, all of which are incorporated by reference.

BACKGROUND OF THE INVENTION

1. Technical Field

This application relates to insurance, and more particularly to automated insurance bundling.

2. Related Art

Applying for insurance may be an involved process. It includes providing demographic information, driving records, and other information. It can also be a slow process. After deciding on what to insure, applicants may select one or more insurance carriers. Because insurers may not evaluate the same criteria, they may require different information.

The assessment of an applicant may be subjective. It is not uncommon for an applicant to receive different rates, different coverage levels, and different terms from different insurers. If an applicant is not prepared to complete several applications at many locations and normalize the insurance quotes they receive, they may be forced to pay higher costs because the applicants may not be able to adequately compare their policy quotes. Therefore, there is a need for a system that allows users to receive and compare multicarrier quotes that is fast, convenient, and secure. There is also a need for semi-automated or automated system that suggests insurance products based on the viability and likelihood of a user's acceptance.

SUMMARY

An automated multiproduct quoting system allows users to receive insurance quotes from geographically remote insurance carriers at one location. The system includes an interface that may receive user data directly or through an intermediary. An on-line data acquisition system selectively passes insurance related applicant data to a record keeping system. The record keeping system includes records, each of which comprise fields that facilitate searching, sorting, and recombining the applicant data with other data. Insurance servers or controllers asynchronously transmit user data automatically to one or more insurance carriers through rules and scores that determine product selection, carrier selection, the timing of offers and/or other variables related to insurance quotes. An insurance server or program receives policy decisions and/or insurance quotes by harvesting postings from insurance sites or through receipt of quoting data and purchase data from one or more insurance carriers. The insurance servers may be configured to index multicarrier quote data in the record keeping system. Digital and/or analog link(s) may be configured to convey one or more quotations to a user.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the inventions.

BRIEF DESCRIPTION OF APPENDICES

Appendixes 1-7 are exemplary flow diagrams of an alternative MPQ process.

Appendixes 8-11 are exemplary use cases and exemplary dynamic web pages that may be rendered through the exemplary use cases.

DETAILED DESCRIPTION OF THE PREFERRED EMBODIMENTS

A multiproduct quoting system streamlines the insurance quoting process by coordinating activities associated with selecting, offering, and providing insurance. The system may enhance the collection of information related to insurance by gathering information in real-time, near real-time, or after a delay at a physical or a virtual site. The system may leverage data by distributing the data to devices, entities, sites, or persons that provide insurance or may be associated with providing insurance. The system may transmit integrated insurance documents directly to a consumer (without involvement of an insurance agent or personal representative of an insurer) in real-time, near real-time, or after a delay that reflect the consumer's selected policy parameters and sell insurance product bundles directly to the consumer.

Figure 1:
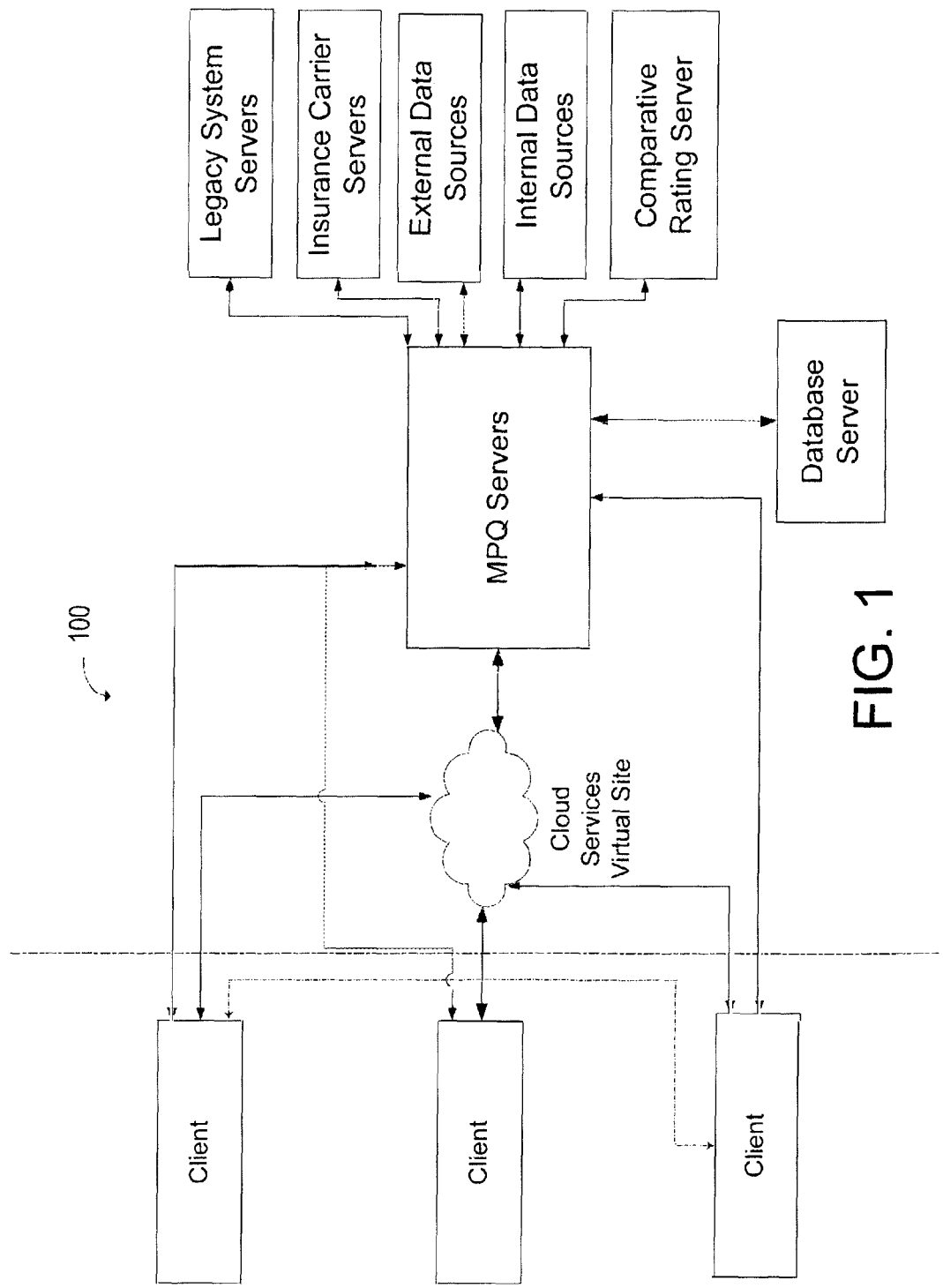
FIG. 1 is an exemplary multiproduct quoting ("MPQ") architecture in communication with multiple remote insurance carriers.

The system may comprise a local area and/or wide area network that may split processing of user data between a front-end client and a back-end insurance server or insurance server cluster or insurance server farm that may be used in a client or server architecture as shown in FIG. 1. The client may reside on a mobile device, wireless device, local or remote stand-alone desktop or portable computer or controller that may execute various computer applications to send data over a network or pull content. A customized client-server protocol may be used to communicate between a privately accessible network and a publicly accessible network. The insurance server or host insurance server may comprise a single computer or a group of independent network servers that operate, and appear to local or remote clients, as if they were a single unit although they may be spread across a distributed network. The insurance server may comprise program(s) that provide time sharing, load balancing, and data management between local or remote clients, provides multiuser functionality, supports persistent and/or non-persistent connections with local or remote clients, and/or may provide or stand behind various firewalls and other security hardware, software and/or other features. The logic and programming may be distributed among multiple computers and other devices, some of which may work independently but also may communicate with other remote or local devices or legacy systems/servers that have similar or different operating systems.

The automated multiproduct quoting system may format data so that it provides useful content that may be used or supplemented while reducing the amount of data entry required in a quoting process. Some systems include hardware and/or software that quantify applicant or user data. Demographic, insurance, financial, and/or other data from a user and/or third parties may be quantified by the system (e.g., in some cases, translated into numerical values, ratings, or scores based on a numerical point scale) to determine the viability or likelihood a user may qualify and/or may accept an offer of insurance from one or more insurance carriers. An insurance offer or an acceptance of a quote by a user may occur in real-time, near real-time, or after some delay through a native application or Web based application. Some systems allow representatives, such as direct insurance representatives or insurance agents, to interface or supplement the system. Some agents validate user data (e.g., error checking or a check to ensure all needed questions are answered in one or more on-line applications), facilitate processing, and/or facilitate insurance policy distribution from multiple carriers by acting as an intermediary.

The automated multiproduct quoting system may communicate with multiple remote or local clients that may be accessed directly by the insured without any intermediaries (e.g., end user) and/or by or through others. Some remote or local client's interface, are integrated to, or are a unitary part of native application clients, mobile Web clients, or desktop Web clients that may be resident to wireless communication devices, such as cell phones, wireless phones, personal digital assistants, two-way pagers, smartphones, portable computers, vehicle based devices, game counsels, televisions, or other such devices that include one, two, three or more processors such as portable processors (e.g., central processing units, digital processing units, graphical processing units, etc.) that interface a local storage device or virtual (or remote) storage resources such as on-line cloud storage resources. The native application clients may take advantage of a mobile device's capabilities, features, and built-in (or accessible) sensors such as global positioning sensors ("GPS"), cameras, etc. The GPS, camera, and resident application software (e.g., optical character recognition "OCR" software and optional geo-tagging software) may capture or scan objects (e.g., driver's license information, vehicle identification numbers, bar codes, etc.) and deliver that information, and in some systems geographical identification metadata, to a prefill or autosuggest data to the client software that may automatically prefill or suggest data to prefill one or more inputs (e.g., templates, online applications, forms, etc.) that may be transmitted to the automated multiproduct quoting system.

Information may be encrypted, use digital signatures, or may be processed or supplemented with other security measures to protect the integrity of the information shared between the multiproduct quoting system and the local and/or remote clients and vendors. Remote clients may communicate with the automated multiproduct quoting system through a matrix of networks, gateways, bridges, routers, and/or other intermediary devices that handle data transfer and/or data conversions from a sending network protocol to a similar or different receiving network protocol. Client rendering protocols may include HTML5, CSS3, Adobe Flash and/or other protocols. Intraware, groupware, or other software may translate the data received from the clients, remote computers, or remote insurance carrier systems into compatible data that is received and stored in the data stores and/or host insurance server cluster/insurance server farms through a publicly accessible distributed network like the Internet or a privately accessible network like an Intranet. The data may include text, graphics, images, multimedia, and/or other information that may be stored at substantially the same rate that the data is received, after some delay, or at a near real-time rate in memory that serves the data stores. A real-time operation may comprise an operation matching a human's perception of time or a virtual process that is processed at the same rate (or perceived to be at the same rate) as a physical or an external process. The memory may be part of on-line cloud storage resources or local or remote storage devices that may include nonvolatile memory (e.g., memory cards, flash drives, solid-state devices, ROM or PROM or EPROM or EEPROM, etc.), volatile memory (e.g., RAM or DRAM, etc.). In some multiproduct quoting systems the data stores are retained in a database or are part of database server(s) or cluster. The databases may retain data in a database structure and supports a database sublanguage (e.g., structured query language, for example) that may be used for querying, updating, and managing data stored in the local or distributed memory. The databases may be accessible through one or more database engines or software interfaces between the databases and a device. The database engines may manage requests for database actions, maintain database security, and ensure compliance with data integrity requirements.

Figure 2:
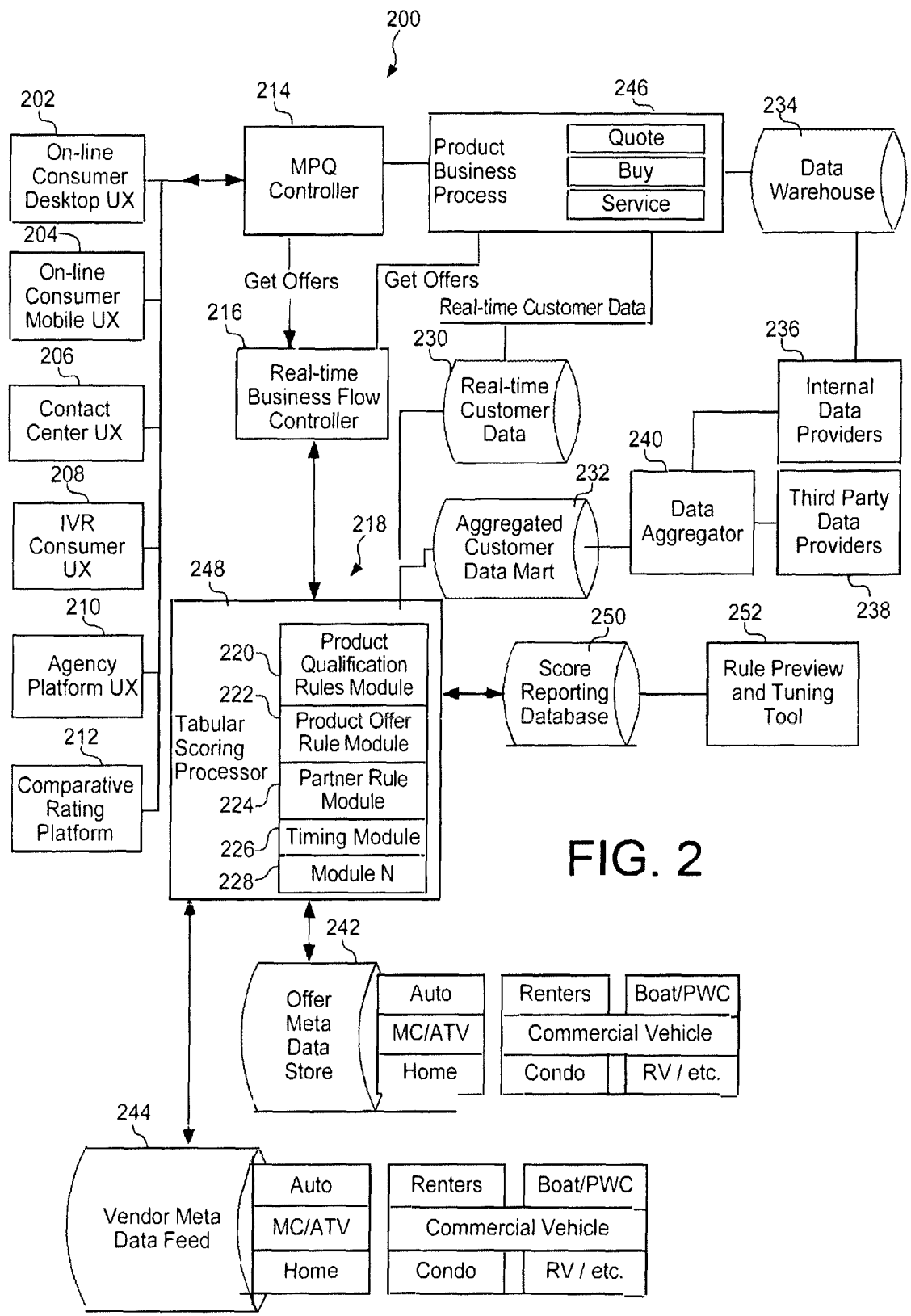
FIG. 2 is an exemplary architecture of a business offer—process controller within a multiproduct quoting ("MPQ") system.

A business offers—process controller ("offers controller 200") that may be part of a multiproduct quoting system is shown in FIG. 2. The offers controller 200 may provide one or more functionalities that include qualifying insurance applicants, selecting or suggesting one or more insurance products, selecting one or more insurance carriers from multiple insurance carriers that are willing to underwrite the insurance policies, determining or suggesting appropriate coverages, determining the appropriate time(s) to extend one or more offers to a qualifying applicant, selecting the appropriate mediums to extend the offers, providing multicarrier quotes, closing insurance sales and/or fulfilling insurance transactions. In some multiproduct quoting systems, the controllers 214-216 and 246 and processors 218 of the offers controller 200 may be served by an insurance server cluster that executes software and utilizes application specific hardware that automates insurance policy transactions and renders a dynamic, fixed, and/or variable content and documents that may be delivered to an intermediary such as an insurance agent or a direct service representative or may be delivered to a user (e.g., may encompass a consumer, a prospect, a customer, or an end user). In some alternative systems, a user may be provided with an insurance quote through a call center, an integrated insurance document, or a Web link.

In FIG. 2, the offers controller 200 may be accessed or communicate with multiple data channels. The channels may serve an on-line desktop user interface 202, a mobile user interface 204, a call center user interface 206, an interactive voice response ("IVR") system interface 208, a remote insurance agent or agency enterprise network or platform interface 210, and a comparative insurance rating application or platform 212. A multiproduct controller 214 orchestrates the operation, selections, and some of the data management within the offers controller 200. When information is received through the channels, such as a request for a transaction or to service one or more insurance products, some multiproduct controllers 214 suggestively sell other insurance products from multiple insurance carriers without the user entering additional data. Through a real-time business flow controller ("business flow controller 216") and one or more tabular scoring processors (that may include a "scoring processor 218"\and/or a "scoring engine 248" that may include a processor (hardware) and/or a portion of an application program that is executed by the processor), one or more suggested insurance products may be selected, one or more insurance carriers willing to underwrite the products may be identified, appropriate insurance coverages may be suggested, and the appropriate time(s) to offer such quote(s) for such lines of product(s) to a qualifying consumer or prospect through selectable communication mediums may be determined. The insurance quotes transmitted to the user may be unsolicited quotes from multiple insurance carriers that are offered as an insurance bundle. The quotes may be offered in response to a request from a product business process or service provided by a product business process controller 246 and/or the multiproduct controller 214.

Real-time customer data may be captured and stored in one or more databases 228. The data may be retained in a non-transitory media and may be processed with data received from one or more data marts 232 and/or one or more data warehouses 234. The data marts and/or data warehouse 232 and 234 may be distributed over one or more local or geographically remote networks and may support several databases that retains information from multiple internal 236 or third party 238 sources in one or more data formats. Access to the data marts 232 and/or data warehouse 234 may be transparent to the scoring processor 218 that may transmit commands to retrieve and analyze the information received from the data marts 232 and/or data warehouses 234. The data marts 232 and/or data warehouses may store data about how the data marts 232 and/or data warehouses 234 are organized, where the information can be accessed, and any connections or links between the stored data. Some data marts 232 and/or data warehouses 234 are accessed by the scoring processor 218, and in some systems a data aggregator 240, to aggregate or organize user data, coordinate updates, identify relationships and/or establish operational and functional links between data gathered from the user in real-time or in near real-time 230 with data acquired from internal data providers 234, third party data providers 236 and/or other sources.

Aggregated customer data 232, real-time or near real-time customer data 230, product related meta data 242, and multi-carrier meta data 244 feed the scoring processor 218 that supports the scoring engine 248. The scoring engine 248 calculates numerical scores through rules that program the rule modules 220-228. Where there are multiple inputs, such as those shown in the exemplary offers controller 200 of FIG. 2, the scoring engine 248 may calculate scores associated with each module separately and in some systems, may summarize all of the various scores into a combined score, a derived score, or one or more prioritized lists from which decisions may be made. For example, in FIG. 2, the scoring engine 248 may generate one or more separate scores as to whether or not to quote one or more insurance products, what product(s) to quote, which carrier(s) to request quotes from, when the quotes should be made to a user and/or the medium or mediums to extend such offers. Some scoring engines 248 also generate a prioritized list of insurance products and a prioritized list of carriers that can underwrite those insurance products. In some multiproduct scoring systems, scores and prioritized lists are derived and/or may change in real-time or near real-time making the scores, lists, and product offerings fluid and dynamic. Rescoring may occur when data is received from a user, internal data providers, third party data providers, and/or insurance carriers. The data may change the scoring, prioritized lists, timing and/or quotes in real-time.

The scoring engine 248 may include rule modules 220-228 that comprise software program or portion of a program that determines how the data is processed. A product qualification module 220 may process data that reflects a user's profile with data provided by internal 236 or external third party data 238 providers. The aggregated data may be compared to surrogates or other insurance customers that are strong candidates for one or more insurance products by its rules. The data, criteria, weighting, and/or product qualification scoring thresholds for an insurance product may vary with the insurance carrier's requirements or rules. The data, criteria, weights, and/or threshold rules may be received and may change in real-time or on a batch schedule in response to data received through a vendor meta data feed 244 that may provide real-time or near real-time data through a data-driven process (e.g., as data become available) or through a demand-driven process (e.g., data is delivered when the scoring processor 218 requests such data).

By way of example, a product qualification module 220 may evaluate a prospective residency (e.g., an owned or rented place where one lives) product by evaluating data that reflects the dwelling, the age of the dwelling, the user's buying history, the user's marital status, the dwelling's location, weather patterns, the user's claim history, the user's credit history, etc. The output of the product qualification module 220 (like the other rule modules 222-228) may comprise an action, a list of actions, alerts, and/or a score. In some scoring engines 248, module scores are always calculated by the rules of the program modules 220-228; the other outcomes are optional. When calculated, the product qualification module score may be compared to one or more predetermined qualification thresholds. The qualification thresholds may comprise a maximum value, a minimum value, an average value, or a range of values for qualifying each insurance product that may be underwritten by the system. In some implementations, the comparison may render an automatic prioritization of the variable.

The product offer module 222, like the product qualification module 220, partner module 224, timing module 226, and other modules 228, for example, may process some or all of the data accessible to the scoring processor 218. The product offer module 222 may determines the type of insurance product the scoring processor 218 may recommend to a user. Based on the accessible data, the product offer rule module 222 may calculate product scores associated with the data that may represent changes in life events (e.g., marriage, divorce, legal separation, birth of a child, death etc., that reflects a change in family status that results in an increase or decrease in family members), transactions (e.g., the purchase of a home, the purchase of a vehicle, etc.), user requests (e.g., a request for more liability insurance coverage may indicate an opportunity to quote an umbrella insurance policy) and/or upon other events or occurrences. The data, criteria, weighting, and/or scoring thresholds associated with one or more insurance products may vary with each insurance carrier's offerings, ability to serve geographic markets, the insurance carrier's rules and/or the insurance carrier's requirements. The data, criteria, weights, and/or product threshold rules may be updated on a schedule (such as a daily schedule), in real-time, or near real-time. The updates may be received through the vendor's meta data feed 244 and the offer vendor meta data feed 242.

In some multiproduct quoting systems, the vendor meta data feed 244 provide data and/or rules that execute the insurance carrier's underwriting processes, identifies the products each carrier is willing to underwrite (e.g., MC or motorcycles, ATV or all-terrain-vehicles, PWC or Personal Watercrafts, CA or commercial auto, etc.), the geographic markets served, etc. The offer vendor meta data feeds 242 may provide the other data and/or rules needed to quote, see, and/or underwrite an insurance policy for one or more products. The data and/or rules may include information or details about an insurance policy including terms, limits, conditions, deductibles, exclusions, liability limits, coverages, pricing, discounts, payment plans, performance, policy amendments, renewal dates, and/or etc.

The partner rule module 224 may prioritize the insurers available for each recommended insurance product. Based on the data accessible to the scoring processor 218, the partner rule module 224 may calculate partner scores based on information received from each of the insurance carriers. The information may be based on the insurance carrier's underwriting processes, the products each carrier underwrites or sells, the geographic markets served, cost, and other data used to quote, sell, or underwrite the insurance products. Based on the partner scores generated in the multiproduct system, the insurance carriers may be assigned a priority or assigned to a prioritized list that determines the order in which an insurance carrier may be recommended to a user for a selected insurance product.

The timing of the quotes may also be assigned a score and prioritized based on the real-time customer data, internal data, external third party data and vendor data. Based on comparisons to historical data that reflects past experience, the timing module 226 may score the likelihood of when a user may accept a policy recommendation. The historical data may reflect when decisions are made such as when changes in life events occurs (e.g., changes in family status that results in an increase or decrease in family members), when transactions occur (e.g., the purchase of a home, the purchase of a vehicle, etc.), when user requests are received (e.g., a request for more liability insurance coverage may indicate an opportunity to quote an umbrella insurance policy), when other happenings occur, at a time of day, day of the week, month of the year, etc. The timing module 226 may recommend an insurance product during a product's life cycle or value chain that may occur during a renewal period, servicing an insurance policy, servicing a request for an insurance quote, purchasing insurance products, processing an insurance claim, settling an insurance claim, proposing or processing an amendment (e.g., something that alters an insurance policy) or an endorsement (e.g., something that adds to an insurance policy), or upon occurrences of other insurance related events that indicates a likelihood of a user's acceptance. In FIG. 2, a product business process and/or product business process controller 246 triggers the request.

The real-time business flow controller 216 communicates with the scoring engine 248 and the multiproduct controller 214 and/or one or more product business processes. The real-time business flow controller 216 directs and manages the real-time delivery of a suggested insurance product and suggested insurance carriers to the multiproduct controller 214. Working with the scoring engine 248, the real-time business flow controller 216 coordinates the operation and integration across multiple networks and often multiple autonomous insurance carrier systems. When quotes are requested by the product business process controller 246, the real-time business flow controller 218 manages the cross domain processes and handles processing the exceptions. The real-time business flow controller 216 delivers the numerical scores, composite summaries, and/or prioritized lists from which decisions are made to the multiproduct controller 214. The multiproduct controller 214 delivers quotes for the suggested insurance products, identifies one or more insurance carriers willing to underwrite those products, suggest appropriate insurance coverages, and suggest the appropriate time(s) to offer such quote(s) to a qualifying consumer through a selection of a communication medium.

The details of the scoring and transactions that support the scoring and the prioritized lists may be stored in a log or a score reporting database 250. In some applications the score reporting database 250 may trace all of the activities affecting a quote, such as a data record from the time a score is generated until the time it is no longer processed. In these processes, the score reporting database 250 may make it possible to document what was transmitted to each selected insurance carrier and what data was received. In some applications, the score reporting database 250 also makes it possible to retrieve scores and other associated data when user sessions are interrupted or an offer or quote is re-solicited. If requested in a predetermined period of time, the quote may still be open and pending. A preview and tuning device (or tool) 252 may also access the score reporting database 250 to execute or evaluate rule changes. By running prospective or modified rules on empirical data, such rules may be evaluated, modified, or eliminated before elevating some rules to the scoring engine 248.

Figure 3:
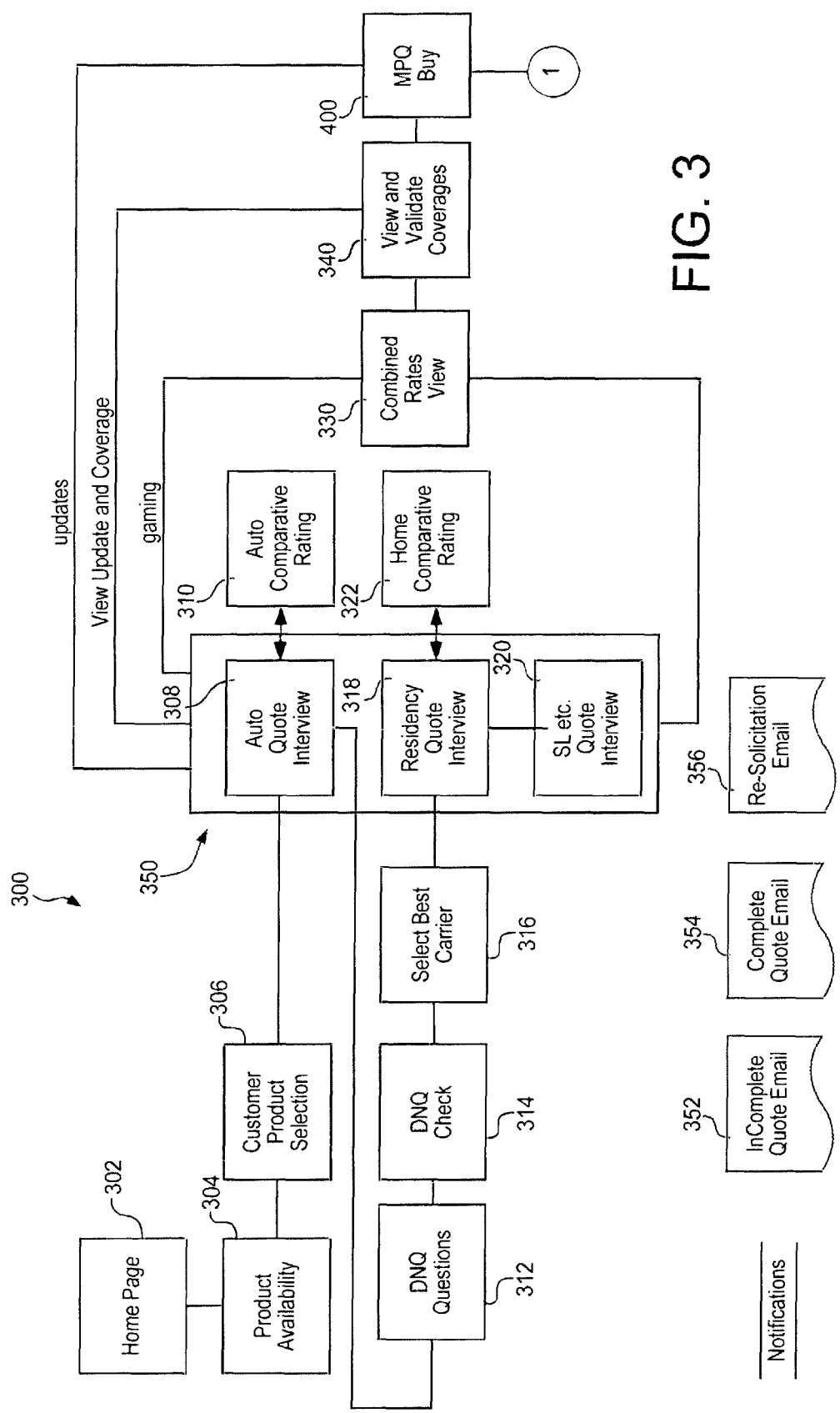
FIG. 3 is an exemplary flow diagram of a MPQ quote process.

An exemplary multiproduct quoting process ("MPQ quote process 300") shown in FIG. 3 allows a user to receive quotes from multiple sources through a client interface. After a user's geographic location is identified at a document or file intended to serve as a network starting point, such as at home page at 302, a selection of products from one or more insurance carriers may be transmitted to the client interface at 304 for customer selection at 306. Some processes acquire data through an auto data acquisition process at 308. The auto data acquisition process may selectively request and collect data through icons, menus, and/or dialog boxes and/or through queries to remote third party data sources. In some processes, one or more comparative rating engines at 310 (e.g., auto) and 322 (e.g., residency) may automatically transmit comparative rates of multiple insurance carriers to the data acquisition processes at 350. The comparative rating engines may compare plans, rates, and carriers side-by-side (or between user displays). In some implementations, the customized and/or insurance carrier quotes may be normalized at the insurance server(s) or insurance server cluster to ensure a consistent comparison (e.g., a statistical normalization that may render similar coverage, policy terms, etc.). The comparisons may be rendered through a textual and/or graphical comparison that allows a comparison of coverages, deductibles, rates, insurance carriers, other insurance parameters.

When additional information is needed, for example, when a user does not qualify for a desired insurance product, an exemplary process may collect that information through an additional data acquisition process at 312 that may be verified at 314. Once qualified, the process 300 automatically selects an insurance carrier to underwrite the policy. An automated rule-based selection may select the carrier offering a lowest rate, the carrier offering a lower rate at a desired deductible, or the carrier that meets other criteria. When the first quote is completed, a second quote on a second insurance product line may be generated. In FIG. 3, the data harvested for an automobile quote may be further processed to generate a residency quote at 318 and a special lines quote at 320. A special lines quote may cover devices or structures for transporting persons or things that are conveyed by the use of a motorized vehicle, other than an automobile (e.g., motorcycle, Segway, snowmobile, personal watercraft, recreational vehicle, etc.).

Records of all of the quotes offered to a user or quotes offered during a session may be combined and rendered through a combined rates document or view at 330. The process transmits a visual, aural, and/or tangible output of the selected insurance products (e.g., auto, residency, special lines, etc.), quoted rates, and total costs that may be verified at the client. A combined rates view at 330 makes it possible for a user to view quotes from multiple diverse insurance carriers that offered to underwrite the products and an insurance bundling discount (e.g., the discount given for purchasing, at a single price, the insurance products or services that could be purchased separately) on one or successive pages of a display in real-time. Should a user or intermediary desire changes, a gaming process may return the user to any point in the MPQ quote process 300 to modify elections. When no further changes are needed, the elected coverages may be viewed and validated at 340. While the policy parameters (e.g., coverages, deductibles, rates, or other insurance variables) underlying the quote may be recommended by the MPQ quote process 300, the view and validate process 340 allows users to modify those parameters before re-executing the data acquisition processes at 350. If the MPQ quote process 300 is executed on a network like a publicly accessible distributed system, for example, some documents may include links that redirect users to remote insurance carrier sites or processes or may integrate other data and functions serviced by external insurance carries instead of operating as a local turnkey system/process. By aggregating content and services, some implementations of the MPQ quote process 300 allow users to adjust terms, coverages, and/or make other choices associated with a selected insurance product locally or remotely at separate servers. In some implementations, content and services appear to originate from a common source by sharing a common impression characteristic. The impression characteristics may comprise one or more color(s), font(s), styles (s), and/or symbol(s) that may be associated with or may differentiate insurance companies or providers. An impression characteristic may be a distinctive characteristic by which a product or responses comes to be known or is well known (e.g., a trademark or trademark like).

Some MPQ quote processes 300 also transmit notifications. When a quote is complete, incomplete or abandoned, the occurrence may be confirmed or re-solicited by email messages at 352-356, text messaging, by postal mail, or through other visual, aural, or tactile media. Deficient submissions may receive notifications that specify the deficiencies, may prompt the user for information, and/or resolicit the user on a programmed or scheduled basis.

Figure 4:
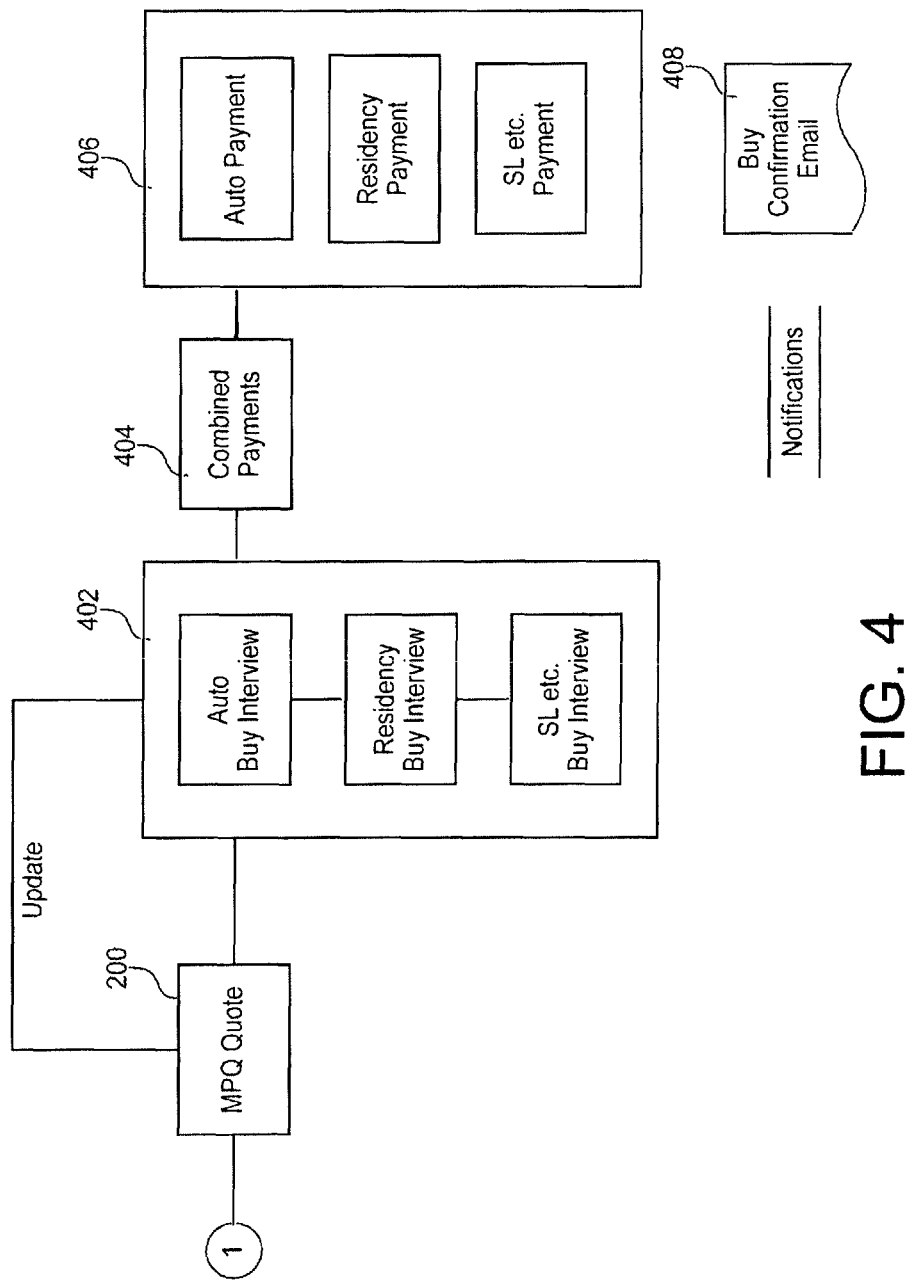
FIG. 4 is an exemplary flow diagram of a MPQ buy process.

Before a purchase is made, more data may be acquired through a data acquisition processes associated with the MPQ buy process 400 of FIG. 4 at 402. In this process, combined or separate online interviews occur to gather any additional information needed to underwrite or confirm a quote. When combined, backend processes (or processors) may resolve the data across the offered product lines. Both process may acquire other data (e.g., sourced from external third party sources such as motor vehicle reports from the department of motor vehicles, credit reports from credit agencies, etc.) to validate and confirm the information underlying the purchase. When exceptions are detected (e.g., a vehicle identification number identifies a different vehicle than what was quoted), the exception may be resolved in some systems by returning the user to the MPQ quote process 300 through an update channel. If non-compliance is found to be due to a superior solution, the exception may be routed to a reviewer that may grant an exception when evaluated. In some systems, grants may occur in real-time or near real-time.

When the data acquisition process is completed, purchases may occur through a single payment that may be distributed to the insurance carriers underwriting the insurance products or they may be paid separately at 406 through a payment module. The optional combined rates page or document at 404 may precede a request for payment to confirm the quoted rates of each elected insurance product. When multiple products are quoted or will be in force when the transaction(s) are closed, a bundling discount may be offered through the optional combined rates page or document 440. In some implementations, the discount may fall within a predetermined range such as between about 2% and about 30%, for example. Payments may be made through credit cards, debit cards, electronic fund transfers, checks, payment processing services, account based services, and/or any other means that convey payment. When complete, incomplete or abandoned, the process may be confirmed or re-solicited by email messages 408, text messaging, postal services, or through other visual, aural, or tactile medium. When a sale is closed some processes may electronically coordinate, electronically generate, and/or transmit or convey documents needed to execute the insurance policies to a client.

Figure 5:
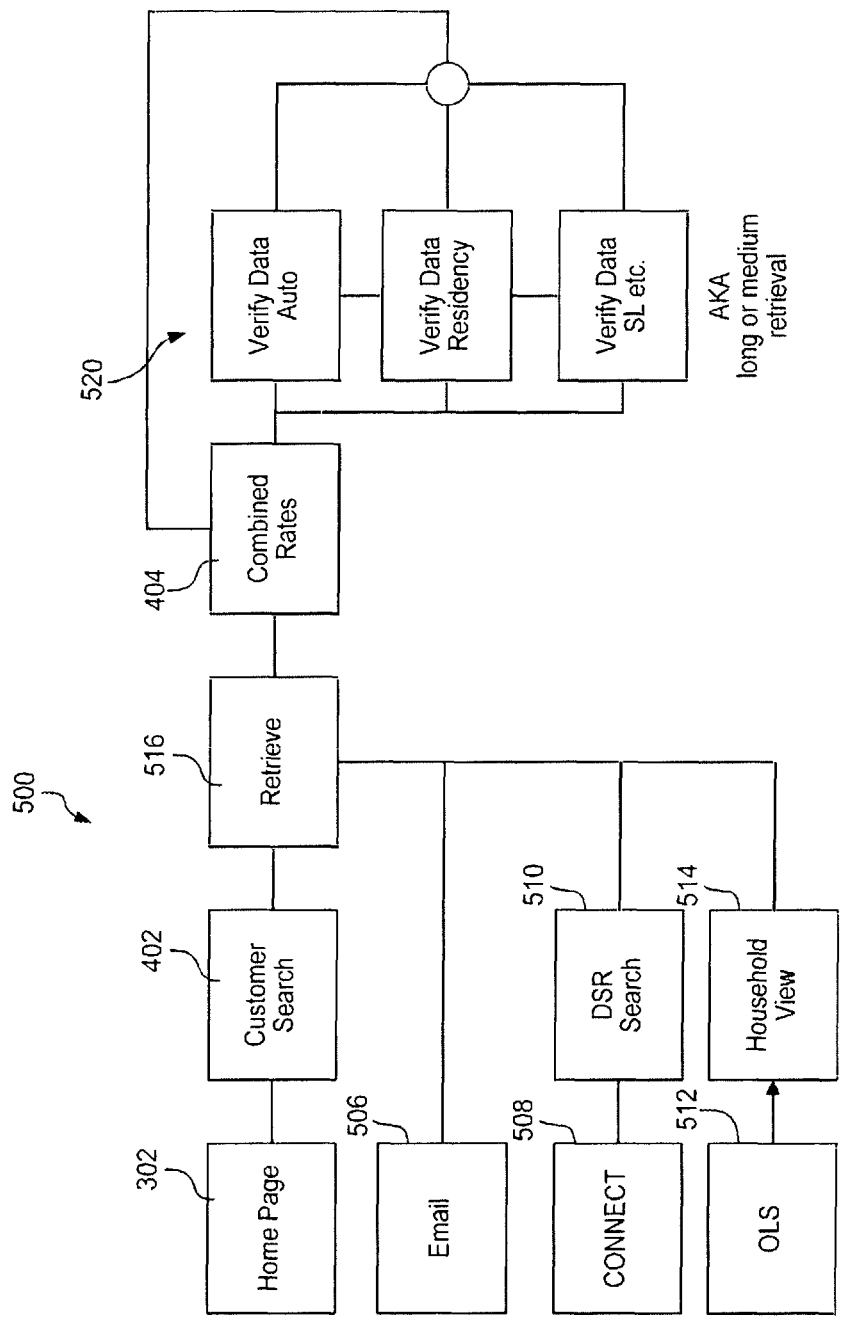
FIG. 5 is an exemplary flow diagram of a MPQ quote search and retrieve process.

A record of all of the activities that occur through the process may be saved in a local or distributed data warehouse. In some processes, quotes may be retrieved by gathering information about the user through a home page or access point at 302 and a search engine 402 shown in FIG. 5. Alternatively, the user may select a hyperlink associated with one or more insurance quotes, insurance products, insurance carriers, etc. that are embedded in an email message 506. Hyperlinks associated with the selection may include additional information embedded in a predetermined format. In one implementation, the information may include unique identifiers which identify or encodes the recipient's identity and an identifier of one or more insurance quotes, insurance products, insurance carriers, and/or data associated with one or more insurance quotes. When transmitted in an email message, the hyperlink may identify or encode the identity of the recipient, and the selection of which may identify the identity of the recipient to the insurance servers or clusters. In some alternative implementations, the selection of the hyperlink may validate the user and may automate a login process or automate access to secure or private information customized to the user. A hyperlink selection may update the MPQ Quote Process 300, may generate an alert or notification that is transmitted to a direct service representative or insurance agent that signals a sales opportunity if a sale is not closed, and may automatically notify the insuring source through its computerized systems.

A direct service representative such as an insurance center representative or an insurance agent may also enter information that facilitates retrieval at 510. In the quote search and search retrieval flow 500 and other flows, a user may convey information by telephone at 508 or by a computer that supports real-time chats. A connecting process may route the information to the service representative or insurance agent with the appropriate experience, servicing skill, and qualifying license. Through a user's interaction with an IVR system or Internet Relay Chat ("IRC") speech recognition software, logical selections of insurance agents and/or insurance center representatives may occur. When calls or chats are misdirected because the insurance agent or insurance center representative lacks the appropriate experience, servicing skill, and/or qualifying license, the call or chat may be transferred to a qualified agent. Alternatively, the user may enter information through a remote computer online or through an online servicing interface at 512 that allows quotes to be retrieved in real-time or after some delay. In some implementations, a household view or dashboard may render and transmit all of the quotes offered to a user through the MPQ quote process 300 to a client via a document. In alternative implementations the household view 514 or dashboard may render all of the quotes offered to a user including quotes offered through other quoting processes to a client.

Whether information is collected off-line, on-line, or through a representative's or agent's interface, once the quote(s) are retrieved, the quote search and search retrieval flow 500 will verify 520 some or all of the data that may vary with the quoted insurance products at 520. In some implementations, errors are identified through a document or a pop help screen. The quote search and search retrieval flow 500 may dynamically generate links or hyperlinks to the pages or documents containing the errors, which allow the user or representative to access and correct the errors in a fast and sometimes sequential order before transmitting the combined rates page at 404 that may precede the verification of each of the quoted rates. It should also be noted that because some insurance quotes may be affected by changes of filed rates or other mechanisms, retrieval of the exact quote may be limited to a predetermined time period, such as one day, thirty days, or ninety days without updating the original quoted rate.

Figure 6:
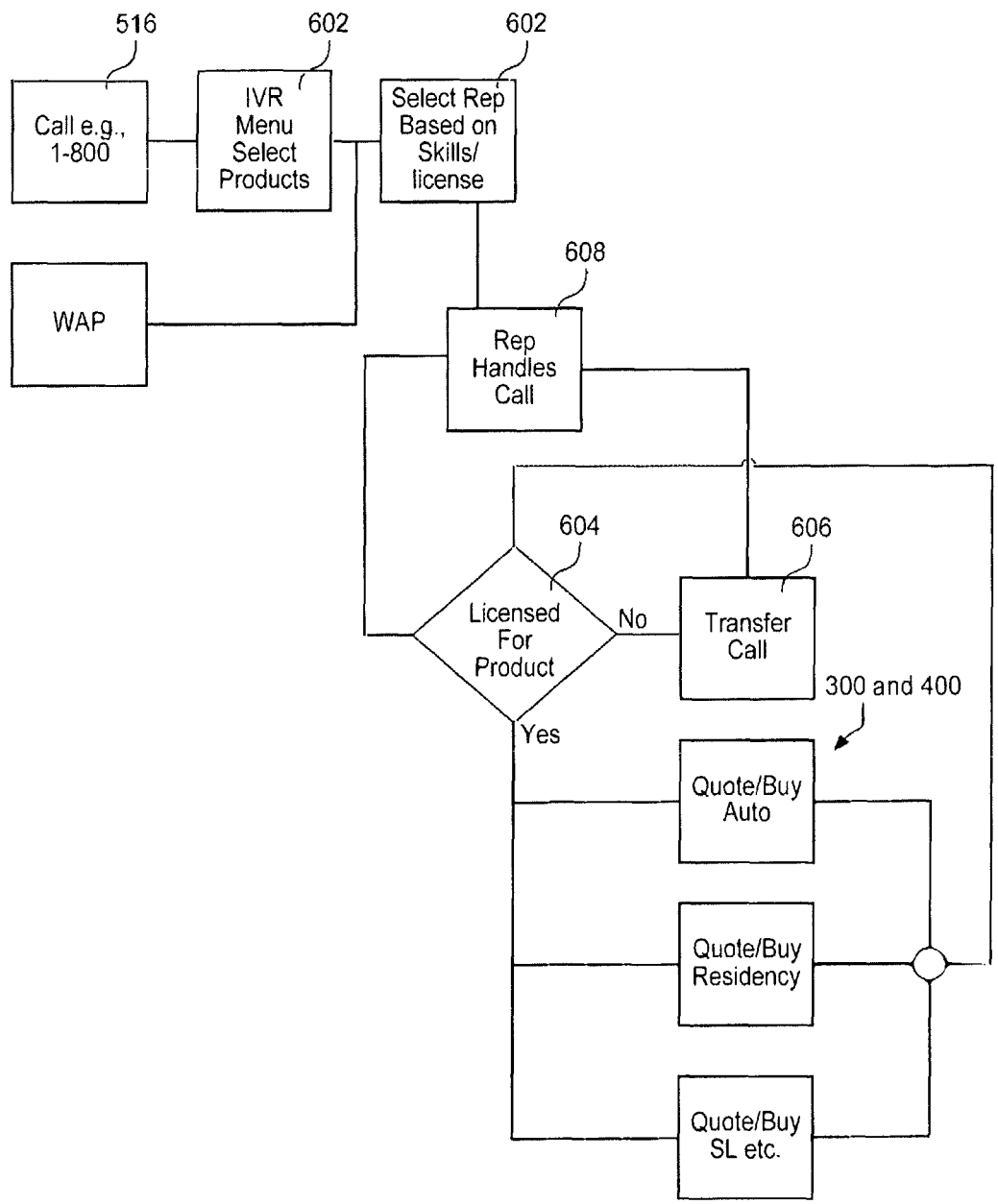
FIG. 6 is an exemplary flow diagram of a MPQ call routing process.

When a call routing system or IRC is used in a quoting process, a user's menu selections 602 conveyed through an IVR or IRC system may facilitate the selections of insurance agents and/or call center representatives in FIG. 6. A connecting process 602 may route a user to a direct service representative or insurance agent with the appropriate experience, servicing skill, and qualifying license. When a contact is misdirected because the insurance agent or call center representative lacks the necessary qualifying license at 604, the contact may be transferred to a qualified service representative or insurance agent at 606 and 608 who may execute MPQ quote process 300 shown in FIG. 3 and/or MPQ buy process 400 shown in FIG. 4.

A reconciliation and exception process enables real-time resolution of insurance quote issues not resolved by the other MPQ processes. A rules-based exception engine may trigger when a user retrieves an MPQ quote or MPQ quote bundle (both referred to as an MPQ quote) after a rate revision, a user attempts to retrieve an expired MPQ quote (e.g., after one, thirty, and ninety days, for example), a user retrieves an MPQ quote after the sale of one product, a user cancels one or more policies that were part of the MPQ bundle, a user desires to purchase an unsold quote for another product that was not originally part of the MPQ quote bundle, user desires to purchase quotes for one or more products that did not originate on the MPQ system or other cases. In each case, the exception engine may execute one or more sub processes associated with a designated rule that may invoke the processes described herein. The end result may add policies to an MPQ quote bundle, revise quotes, propose additional quotes, revoke or modify discounts, etc.

The coordination of an MPQ system allows users to directly quote and purchase multiple products as a bundle while maintaining the ability to quote and purchase the policies individually. The MPQ server or cluster 702 of FIG. 7 manages the integration between the individual product quote and buy interviews. The interviews may use separate or common quote and buy applications and services for end users and the direct service representatives and/or insurance agents. An MPQ orchestration engine 704 may manage or control the MPQ workflow. The MPQ orchestration engine 704 interfaces MPQ components, supports internal and external services, imports data from internal systems and external third parties, and interfaces with product quote and buy applications. A common data collection and display user interface 706 collects and displays common quote and buy data to the end-user. The interface 706 may render combined rates screens or forms and common data collection screens or forms that may be serviced by local or distributed fill applications 714. The common data management services 708 provide services for storing and retrieving common data that may be processed by the MPQ workflow. The residency carrier selection and data services 710 provide rules and services that select insurance carriers and provides carrier data. An insurance carrier's selection may be based on the carrier's abilities to underwrite insurance policies, offer cost competitive prices, offer a range of coverages, and other criteria. The carrier related data may include data that identifies the insurance carriers, their addresses, phone numbers, links to its automated systems, etc. The quote number assignment application assigns quote numbers and MPQ bundle numbers that may be used to track and retrieve MPQ quotes.

Figure 7:
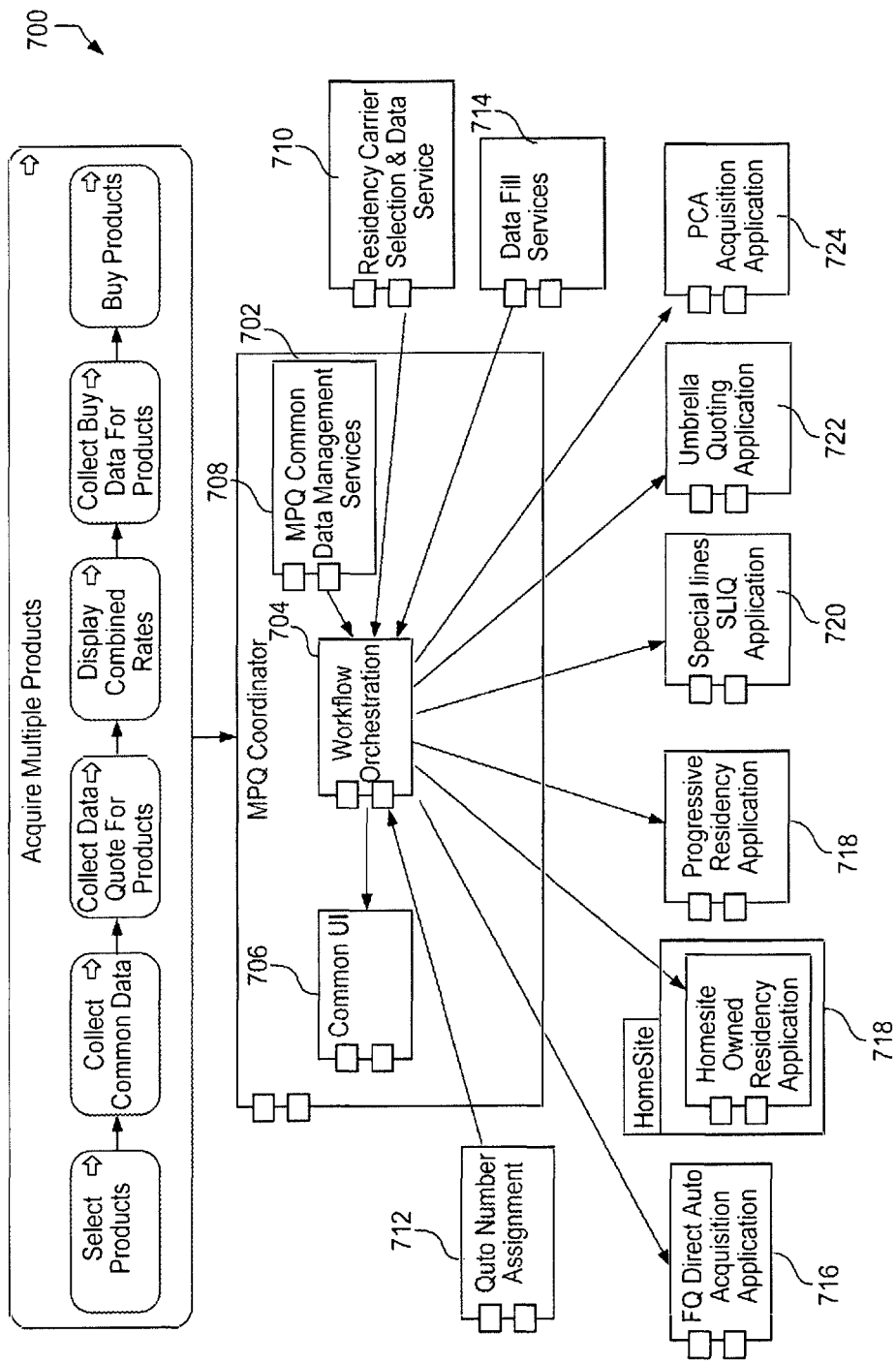
FIG. 7 is an exemplary MPQ coordinator.
Figure 8:
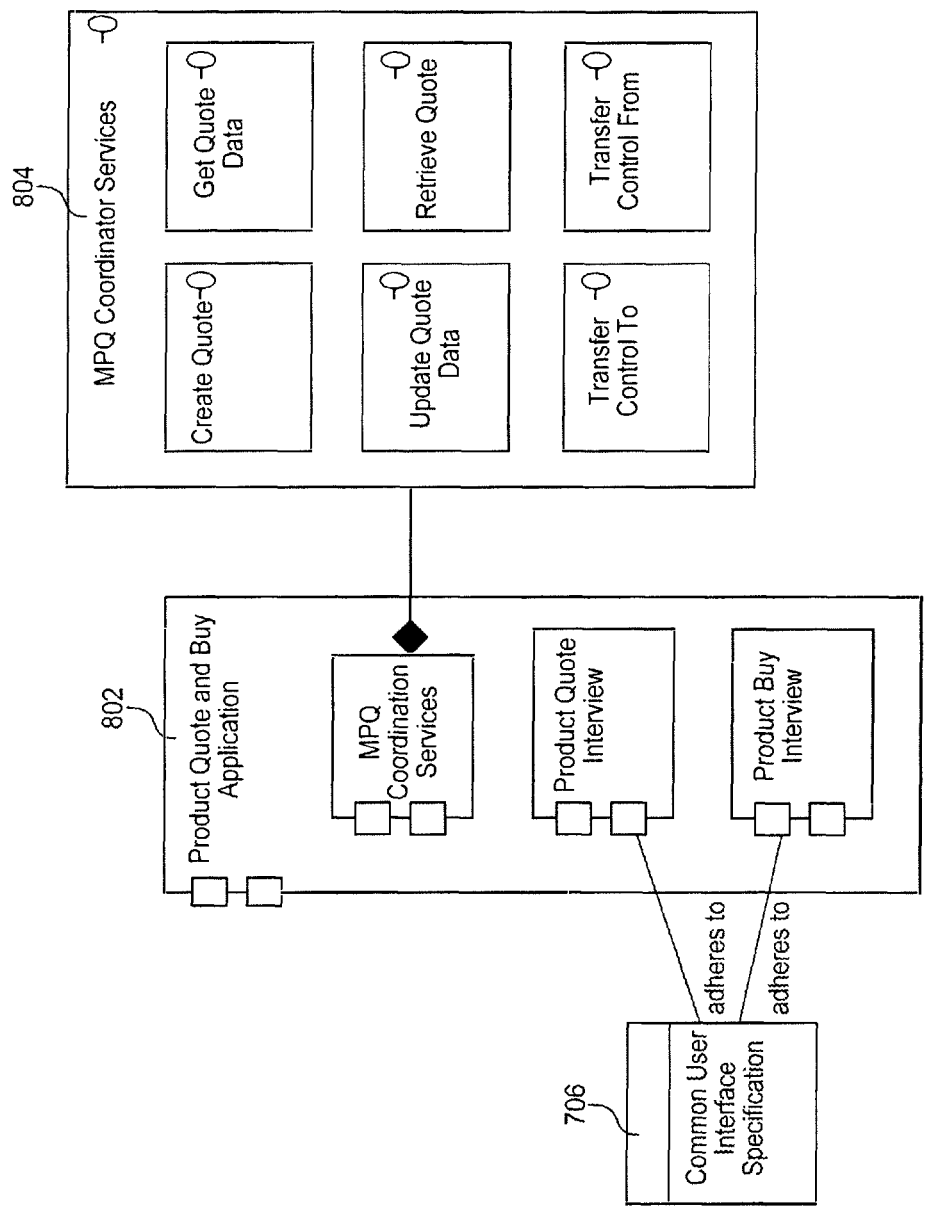
FIG. 8 shows exemplary MPQ coordinator services.
Figure 9:
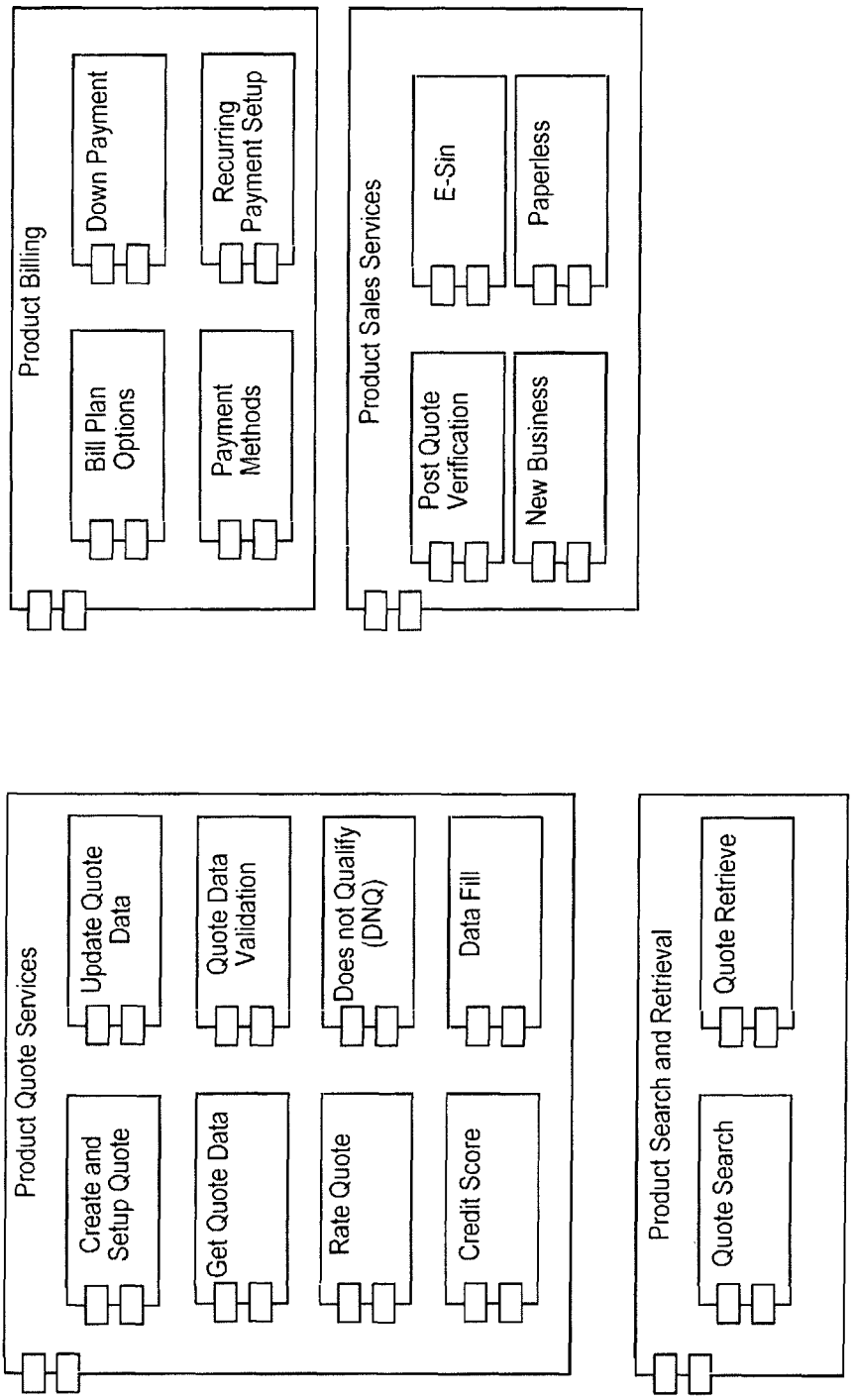
FIG. 9 shows exemplary services of some independent insurance carriers.

Details of the exemplary types of product quoting systems that the work flow orchestration engine 704 may orchestrate are shown in FIG. 7. The product quoting applications may include direct auto applications 716, residency applications 718, special lines applications 720, umbrella quoting applications 722, and commercial quoting applications, like a commercial auto quoting application 724. Each product quote and product buy application 802 may be implement through a standardized set of MPQ coordinator services 804 that integrates and aligns with the MPQ orchestration engine 704 to create an application-aligned infrastructure that can be scaled up or down based on the needs of each product quote and product buy application and services as shown in FIG. 8. In some implementations, the product quotes and buy application and services will follow a set of common user interface (look & feel) standards or impression characteristics. The architecture allows each product acquisition application (e.g., a product quote and buy application) and services to be implemented and maintained independently. The independent services each insurance carrier may provide is shown in FIG. 9. However, the architecture may share technology and services. This flexibility may support independent rate revisions through one or more insurance carriers while providing an optimal user experience. The individual product quotes may be further customized by the user as described in the Customizable Insurance System pending as U.S. application Ser. No. 12/482,111, which is incorporated herein by reference.

In some implementations there may be separate data acquisition interviews per insurance carrier per insurance product. The data acquired through these applications may be supplemented and shared through an application framework that allows for consistency, sharing and reuse of data across carrier and product technical implementations.

Figure 10:
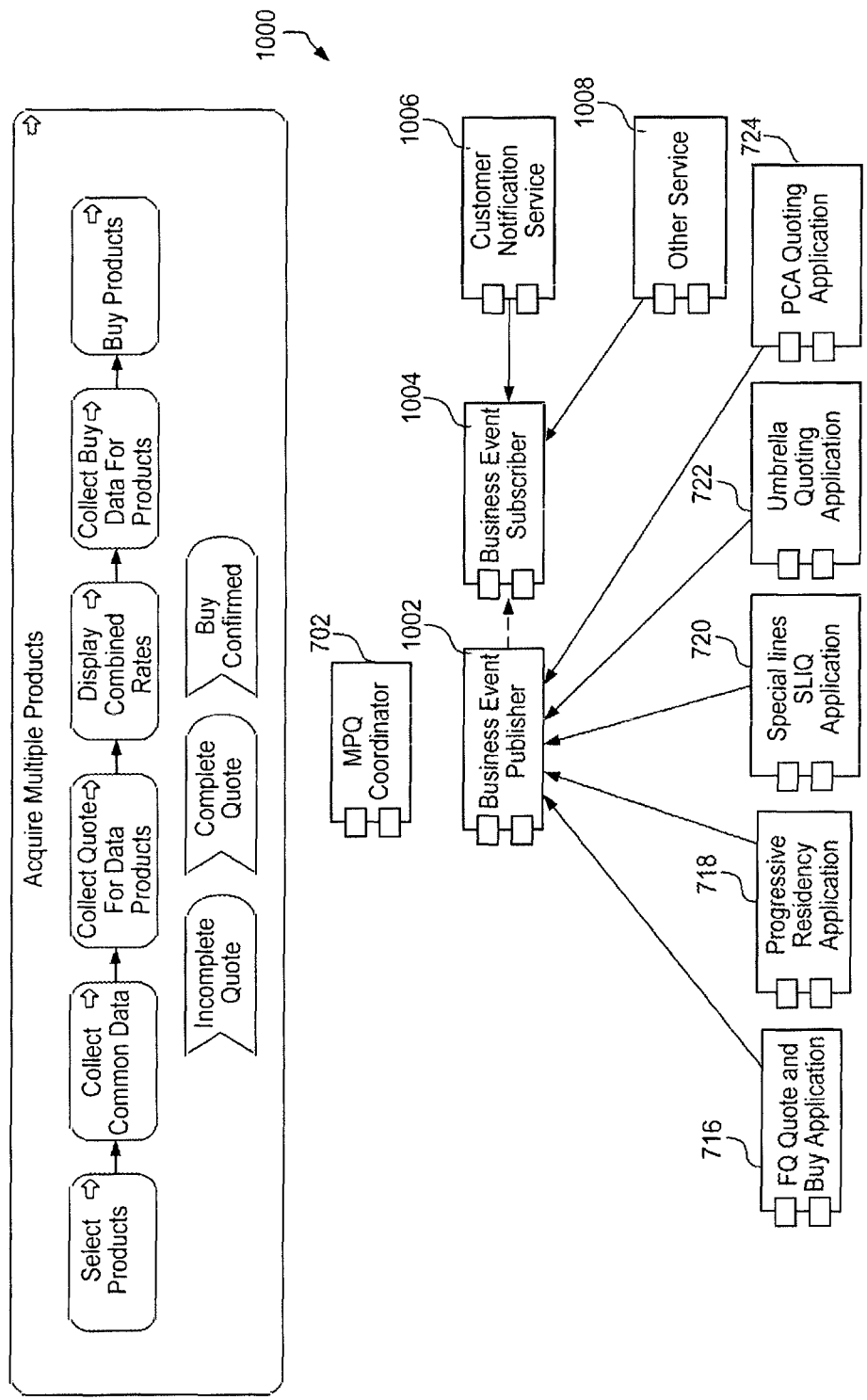
FIG. 10 is an exemplary notification architecture.

In some implementations, individual product application will transmit customer notifications. In other implementations, customer notifications are consolidated for bundled products by aggregating multiple events into a single user notification as shown in FIG. 10. The notification architecture 1000 shown in FIG. 10 includes a business event publisher 1002, a business event subscriber 1004, a customer notification service 1006, and other services 1008. The business event publisher component 1002 consolidates and publishes events so that the events may be consumed by one or more subscribing applications 716-724 locally or through the cloud. The business event subscriber component 1004 provides a uniform subscription process for applications and services to subscribe to all or selected types of events published by the business event publisher component 1002. The customer notification service component 1006 generates visual, aural, or tactile notifications based on events that it subscribes to. The customer notification service component 1006 may utilize the business event subscriber reusable components to subscribe to events published by the business event publisher component 1002. Examples of these notifications include: Incomplete Quote Email/text/graphic/etc., Complete Quote Email/text/graphic/etc., Re-Solicitation Email/text/graphic/etc., Buy Confirmation Email//text/graphic/etc., etc.

The business event publisher component 1002 may deliver messages over clients' protocol of choice (e.g., HTTP, email, SMS, etc.) through a "push" mechanism (e.g., at the instigation of the server) that eliminates the need to periodically check or "poll" for new information and updates. Through the business event publisher component 1002 notifications related to time-sensitive information updates, mobile applications quote notifications, complete quote notifications, buy confirmations, and many others that may be delivered to subscribing users in real-time. In some implementation resolicitation notifications may be transmitted through the business event publisher component 1002 per an insurance line that was previously purchased. If a user purchased automobile insurance in the past, the user may receive an automobile insurance promotion. If a user purchased residency insurance, the user may receive a renters or homeowners promotion and so on. The customer notification service 1006 may further allow one or more insurance carriers to control the frequency and delivery of the resolicitation notification across one or more product lines under one or more scenarios. Each of the notifications may represent a potential future opportunity to bundle an additional insurance product.

Some business event publisher components 1002 provide notifications through other service component 1008 when one or more other services may need to monitor, collect and/or process events that may be generated by multiple applications such as data feeds. Other business event publisher components 1002 may communicate through one or more social networking Web sites, social media sites, and/or social networking profiles that provide access to customers, users, and/or insurance consumers to support or facilitate some or all of the processes and systems described herein. The communication and/or connection hardware and/or software of the business event publisher components 1002 may process presence information on social networking Web sites, social media sites, etc. The presence information may comprise a status indicator that conveys the ability and willingness of a potential communication with a desired insurance customer, user, consumer and/or prospect. Some communication and/or connection hardware may be programmed and/or configured to process presence information that may identify personal availability (e.g., such as processing personal availability records or presentity data) and/or may be programmed and/or configured to notify one or more direct service representatives or insurance agents when a desired insurance customer's, user's, consumer and/or prospect's presence state changes (e.g., a desired insurance customer, user, consumer, or prospect becomes available) that may also indicate the insurance customer, user, consumer and/or prospect's willingness to communicate.

Figure 11:
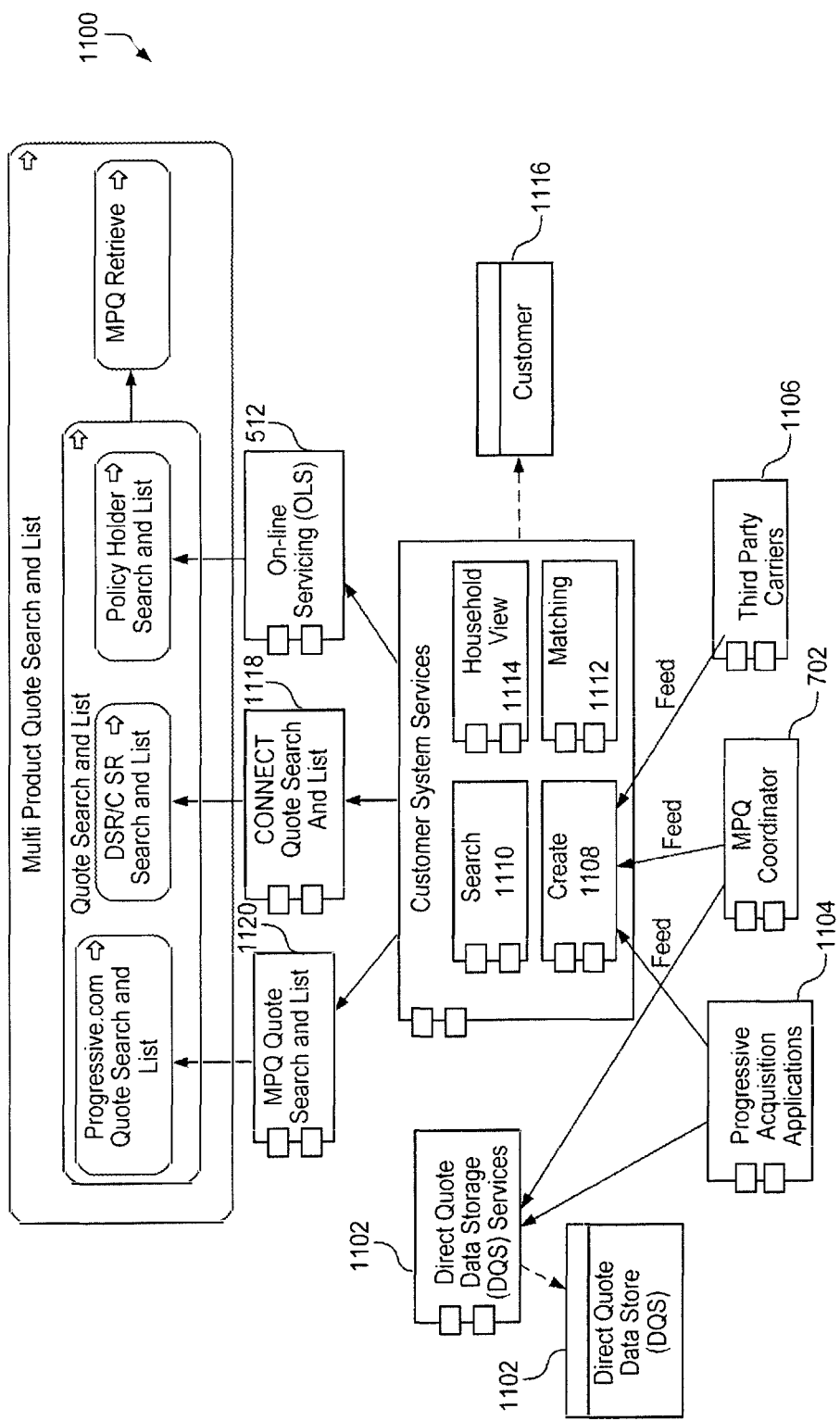
FIG. 11 is an exemplary search and retrieval architecture.

There are multiple methods for an end user, direct service representative, and/or insurance agent to search for and receive a list of quotes. Both the direct quote data store (DQS) and a customer system service system engine may associate quotes in an MPQ bundle. One such method may search and locate one or more quotes (e.g., a list of quotes) and/or insurance policies associated with a user through the search and retrieval architecture shown in FIG. 11. The customer systems services 1102 component retains information about the MPQ system's users. It collects and aggregates user data including data that indicates what policies and what quotes or MPQ bundle a user received. A data capture component 1108 imports the data from internal systems (e.g., 1102, 1104, 702, etc.) or an external third party 1106 through a MPQ defined format. A rule based search engine 1110 and matching engine 1112 searches and compares the captured data until some or all of the associated quotes in the multiproduct bundle are identified. A household view 1114 or dashboard may render and transmit all or some of the quotes offered to a user through the MPQ quote process 300 to a user or customer 116 through a document. The details of the quotes and searches may also be transmitted through multiple interfaces including call center interfaces 1118, on on-line servicing interfaces 512, a direct interface 1120 to one or more insurance carriers, direct/customer service representatives, policyholders, and/or etc.

Figure 12:
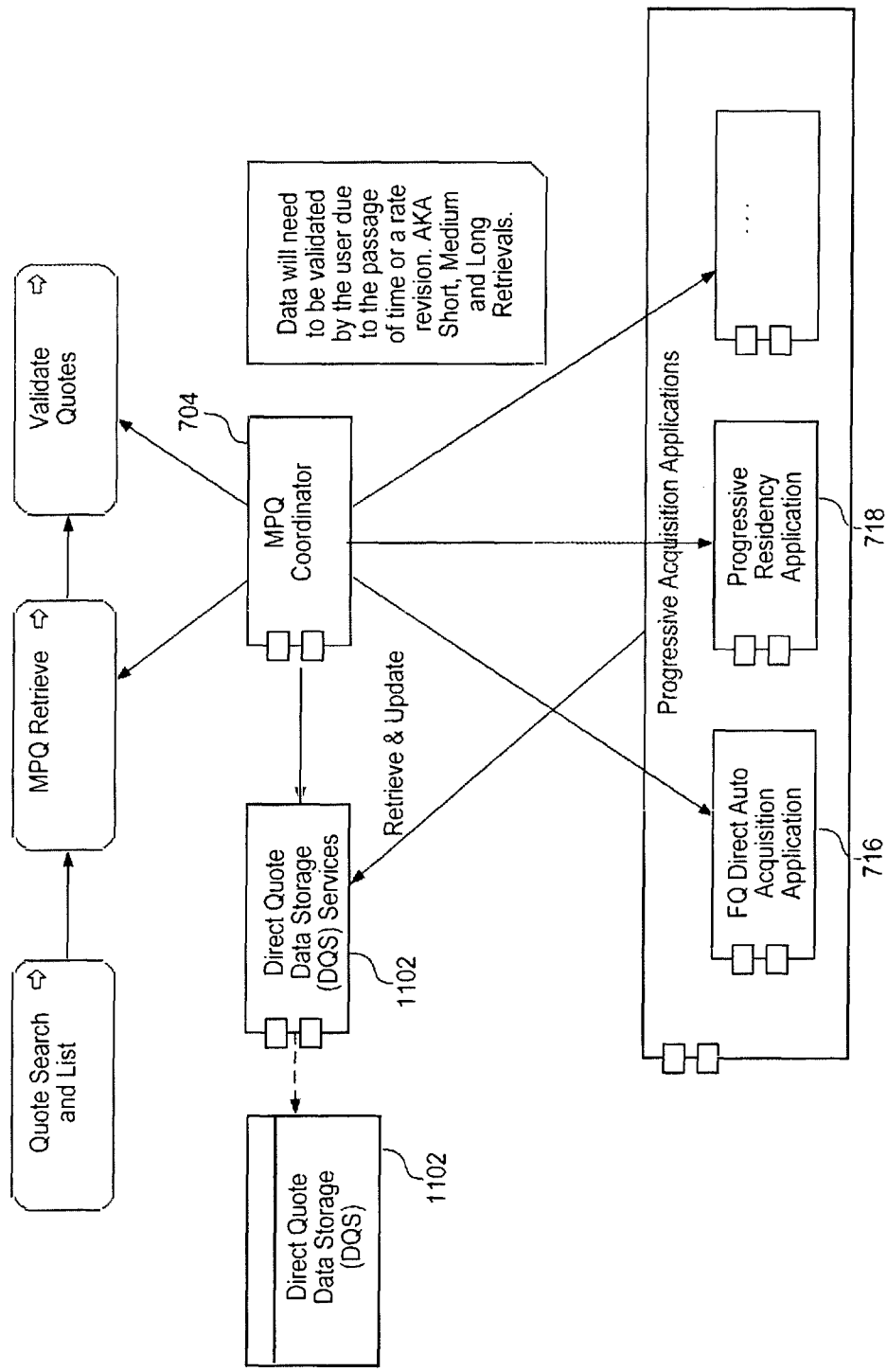
FIG. 12 is an exemplary retrieval architecture.

Once a set or bundle of quotes is located, the MPQ orchestration engine 704 may instruct the applications to retrieve and validate the quote data as shown in FIG. 12. Quote data validation may be required due to the expiration of a quote, the passage of time or a rate revision, etc. If a quote needs validation, in some implementation a user may manually or automatically (e.g., through a quick-fill application that may automatically prefill or suggest responses)

verify quote information prior to receipt of a quote or a bundle of quotes. Through the retrieval process, the MPQ server or cluster 702 and the MPQ orchestration engine 704 may maintain the validity of multiple quotes through common or different network domains.

Figure 13:
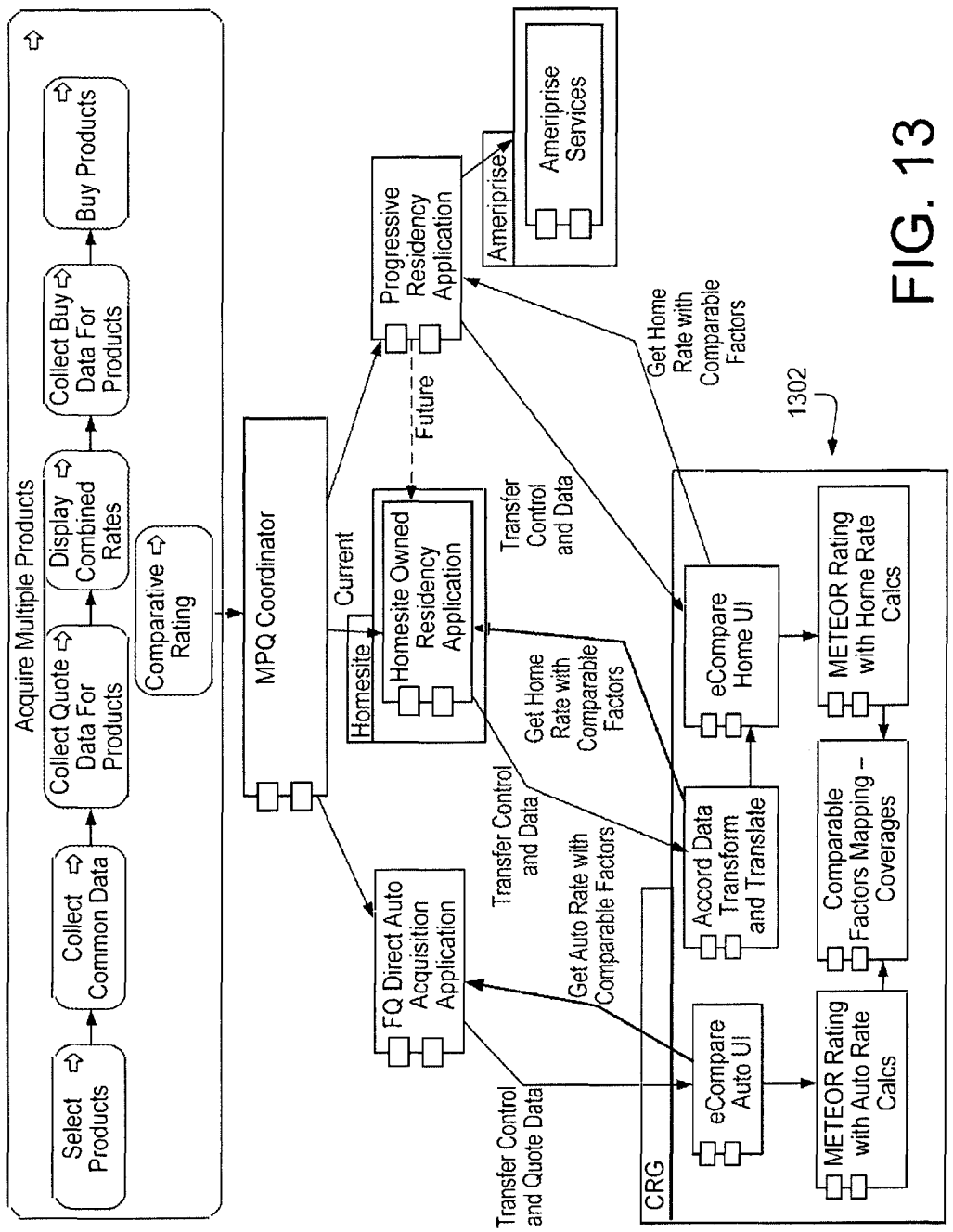
FIG. 13 is an MPQ system integrated with a comparative rating controller.

In some implementations, the MPQ orchestration engine 704 may communicate with a comparative rating controller and MPQ quote process 300 to allow users to compare plans, rates, and carriers side-by-side (or between device screens or displays) twenty-four hours a day seven days a week as shown in FIG. 13. In some implementations, the customized and/or competitor quotes may be normalized at the insurance server(s) or insurance server cluster to ensure a consistent comparison (e.g., a statistical normalization that may render similar coverage, policy terms, etc.). The system may render a textual and/or graphical comparison on through the device that allows a user to compare coverages, deductibles, rates, insurance carriers, other insurance parameters, and elect insurance plans on one or more screens.

In FIG. 13, a comparative rating application 1302 acquires competitive data through interviews and third parties. It may collect the additional data needed to render comparative rates for multiple insurance carriers. Because comparative rating may occur in real-time or near real-time, the data may be collected prior to an MPQ quote. To begin a comparative rate, the MPQ quote process 300 will pass quote data and transfer control to the comparative rating application 1302. During this period, remapping of the quote data may occur that may result in a new or updated quoted rate. The new or updated quoted rate may be provided by the MPQ quote process 300 to the comparative rating application 1302 via a service. Should a user elect to purchase an insurance product under a new or updated quote (after remapping), the comparative rating application 1302 may transmit quote data back to the MPQ quote process 300 that delivers the quotes to the MPQ buy process 400.

A record of some or all of the transaction activities that occur through the above process may be stored in a log in one or more data stores. In some processes, an audit trail traces all of the activities affecting some or each piece of data or information, such as a data record from the time it is entered into the process to the time it is removed in an funnel analytics data warehouse 1402. The audit trail may make it possible to document, for example, who made changes to a record, when that change occurred, and when the document was transmitted to each entity.

Figure 14:
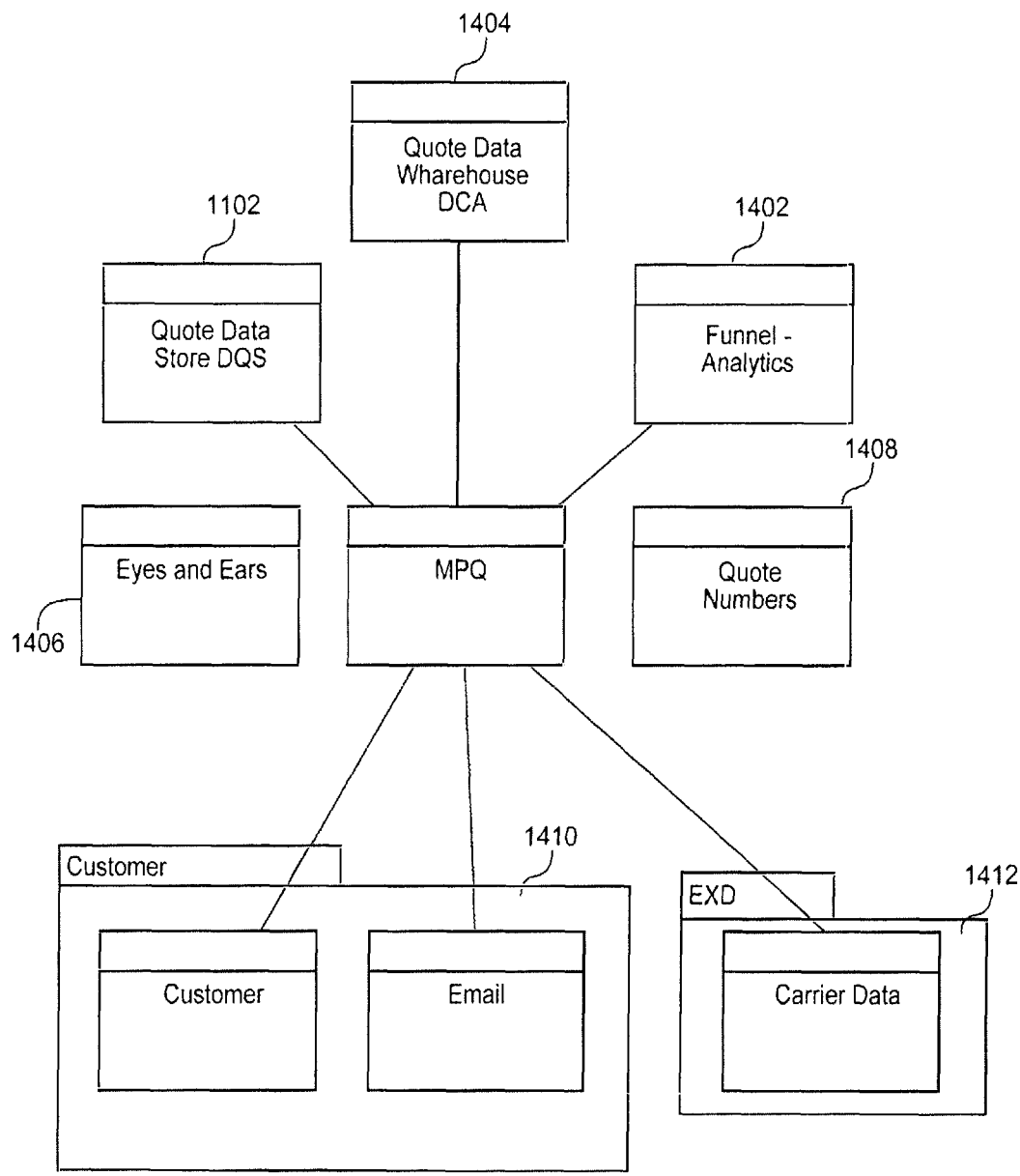
FIG. 14 show exemplary data stores or warehouse that may be accessed by the MPQ system.

As shown in FIG. 14 other data stores may serve the multiproduct quoting systems and processes. A quote data store 1102 stores on-line quote data for search and retrieval and may support associating MPQ quotes and additional MPQ data. A quote data warehouse 1404 stores data for analytical queries for direct products. A funnel analytics data warehouse 1402 stores data for analytical queries and may be used to report usage patterns for internet applications. The feeds to the funnel analytics data warehouse 1402 may allow for tracking of MPQ usage patterns across multiple applications. The eyes and ears data store 1406 stores data for error logging and reporting. The quote number data store 1408 stores assigned quote numbers and MPQ bundle numbers. The customer data store 1410 stores data that may be used to index user data. The user contact or customer email data store 1412 stores access information that may be used to support customer notifications. The carrier data store stores insurance carrier data such as carrier name, phone numbers and links.

The methods and descriptions described may be programmed in one or more servers or may be encoded in a non-transitory signal bearing medium, a computer readable medium such as a memory that may comprise unitary or separate logic, programmed within a device such as one or more integrated circuits, retained in memory and/or processed by a controller or a computer. If the methods are performed through software, the software or logic may reside in a memory resident to or interfaced to one or more processors or controllers that may support a tangible communication interface, wireless communication interface, or a wireless system. The memory may include an ordered listing of executable instructions for implementing logical functions. A logical to function may be implemented through digital circuitry, through source code, or through analog circuitry. The software may be embodied in any computer-readable medium or signal-bearing medium, for use by, or in connection with an instruction executable system, apparatus, and device, resident to system that may maintain a persistent or non-persistent connection with two or more automated lending systems or an intermediary that may convey insurance data to more than one insurance sources. Such a system may include a computer-based system, a processor-containing system, or another system that includes an input and output interface that may communicate with a publicly accessible distributed network through a wireless or tangible communication bus through a public and/or proprietary protocol and may respond to commands, events, actions, and/or requests. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

A "computer-readable medium," "machine-readable medium," "propagated-signal" medium, and/or "signal-bearing medium" may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Other alternative multiproduct quoting systems may be implemented with any combination of structures and/or functions described above or shown in the figures. These systems are formed from any combination of structure and function described above or illustrated within the figures. Besides what is described, logic may be implemented in software or hardware. The hardware may include a processor or a controller in communication with a volatile and/or non-volatile memory that interfaces peripheral devices through a wireless or a tangible medium.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A multiproduct quoting system comprising:
    an insurance server configured to quote and facilitate a purchase of multiple insurance products from two or more insurance carriers as a bundled insurance package;
    the insurance server configured to render on an electronic display of the multiple insurance products or a combined insurance rate of the multiple insurance products;
    an insurance policy module coupled to the multiproduct server that renders on the electronic display an insurance page that reflects selected insurance policy parameters; and
    a transmitter coupled to the insurance server configured to transmit a modified hyperlink element that comprises one or more identifiers that identifies a user's identity and identifiers to the multiple insurance products; and
    where the modified hyperlink element when activated connects the user to the insurance server and validates the user during a validation process.

2. The multiproduct quoting system of claim 1 where the insurance server is configured to asynchronously transmit data to the two or more insurance carriers.

3. The multiproduct quoting system of claim 1 where the insurance server is configured to automatically select the two or more insurance carriers from a plurality of computer accessible insurance carriers.

4. The multiproduct quoting system of claim 3 where the insurance server is configured to automatically harvest a plurality of insurance quotes for the multiple insurance products from the two or more insurance carriers.

5. The multiproduct quoting system of claim 1 where the insurance server is configured to automatically harvest a plurality of insurance quotes for the multiple insurance products from the two or more insurance carriers.

6. The multiproduct quoting system of claim 1 where the insurance server is configured to select at least one of the two or more insurance carriers from a plurality of computer accessible insurance carriers.

7. The multiproduct quoting system of claim 6 where the insurance server comprises a controller that selects the at least one of the two or more insurance carriers from the plurality of computer accessible insurance carriers and the controller comprises a rule-based system.

8. The multiproduct quoting system of claim 7 where the rule-based system selects the at least one of the two or more insurance carriers based on the selected insurance carrier's insurance rates.

9. The multiproduct quoting system of claim 8 where the rule-based system selects the at least one of the two or more insurance carriers based on the selected insurance carrier's product availability and qualification criteria.

10. The multiproduct quoting system of claim 7 where the rule-based system selects the at least one of the two or more insurance carriers based on the selected insurance carrier's insurance rates.

11. The multiproduct quoting system of claim 6 where the multiproduct server is configured to render a plurality of insurance quotes of the multiple insurance products from each of the plurality of computer accessible insurance carriers to an end-user.

12. The multiproduct quoting system of claim 1 where a controller selects at least one of the multiple insurance products and receives suggested insurance coverage levels for the selected at least one of the multiple insurance products.

13. The multiproduct quoting system of claim 12 further comprising rendering a user interface that allows an end-used to modify a plurality of suggested insurance coverage levels of at least one of the multiple insurance products.

14. The multiproduct quoting system of claim 1 where the two or more insurance carriers comprise a first insurance carrier and a second insurance carrier remote from the first insurance carrier.

15. The multiproduct quoting system of claim 1 where the insurance policy module renders a quote for a first insurance product and renders a quote for a second insurance product.

16. The multiproduct quoting system of claim 15 where the quote for the first insurance product and the quote for the second insurance product are generated in parallel.

17. The multiproduct quoting system of claim 15 where the quote for the second insurance product is generated after the quote for the first insurance product is generated.

18. The multiproduct quoting system of claim 1 where an integrated insurance document comprises a plurality of uniform resource locator elements.

19. A multiproduct quoting process comprising:
    generating a bundled insurance package comprising quotes for multiple insurance products from two or more insurance carriers;
    rendering, on an electronic display, the quotes for the multiple insurance products or a combined insurance quote for the multiple insurance products;
    rendering, on the electronic display, selected insurance policy parameters; and
    transmitting a modified hyperlink element that comprises one or more identifiers that identify a user's identity and the multiple insurance products;
    where the modified hyperlink element when activated connects a user to the insurance server and validates the user during a validation process.

20. A non-transitory machine-readable medium encoded with machine-executable instructions, where execution of the machine-executable instructions:
    generates a bundled insurance package comprising quotes for multiple insurance products from two or more insurance carriers;
    renders on an electronic display the multiple insurance products or a combined insurance quote of the multiple insurance products;
    renders on the electronic display an insurance page that reflects selected insurance policy parameters; and
    transmits a modified hyperlink element that comprises one or more identifiers that identify a user's identity and the multiple insurance products;
    where the modified hyperlink element when activated connects a user to the insurance server and validates the user during a validation process.

* * * * *